(12) United States Patent
Kolstrup

(10) Patent No.: US 10,132,319 B2
(45) Date of Patent: Nov. 20, 2018

(54) CENTRIFUGAL COMPRESSOR

(71) Applicant: Rotrex A/S, Ishøj (DK)

(72) Inventor: Anders Kolstrup, Ishøj (DK)

(73) Assignee: ROTREX A/S (DK)

(*) Notice: Subject to any disclaimer, the term of this patent is extended or adjusted under 35 U.S.C. 154(b) by 434 days.

(21) Appl. No.: 14/963,934

(22) Filed: Dec. 9, 2015

(65) Prior Publication Data

US 2016/0169233 A1   Jun. 16, 2016

(30) Foreign Application Priority Data

Dec. 16, 2014 (DK) .............. PA 2014 00733
Mar. 6, 2015 (DK) .............. PA 2015 00141
Apr. 10, 2015 (DK) .............. PA 2015 00218

(51) Int. Cl.
| | |
|---|---|
| *F04D 17/08* | (2006.01) |
| *F04D 29/054* | (2006.01) |
| *F04D 25/02* | (2006.01) |
| *F16H 7/02* | (2006.01) |

(52) U.S. Cl.
CPC .............. *F04D 17/08* (2013.01); *F04D 25/02* (2013.01); *F04D 29/054* (2013.01); *F05D 2220/40* (2013.01); *F16H 7/023* (2013.01)

(58) Field of Classification Search
CPC ......... F04D 17/08; F04D 25/02; F04D 29/054
USPC .................................. 415/122.1; 123/559.1
See application file for complete search history.

(56) References Cited

U.S. PATENT DOCUMENTS

| | | | |
|---|---|---|---|
| 4,545,778 A | 10/1985 | Koivula | |
| 5,154,574 A | 10/1992 | Reinhorn et al. | |
| 5,224,459 A | 7/1993 | Middlebrook | |
| 5,417,617 A | 5/1995 | Milton | |
| 5,887,576 A | 3/1999 | Wheeler | |
| 6,082,340 A | 7/2000 | Heimark | |
| 6,129,510 A | 10/2000 | Martin | |
| 6,763,812 B2 | 7/2004 | Wheeler, Jr. | |
| 7,299,792 B1* | 11/2007 | Jones ............... | F02B 33/40 123/559.1 |
| 8,439,020 B1* | 5/2013 | Carlson ............ | F02B 33/40 123/559.1 |

FOREIGN PATENT DOCUMENTS

GB        1 603 746 A    11/1981

OTHER PUBLICATIONS

European Search Report, Application No. 15388004.2-1607, dated Apr. 18, 2016, 7 pages.
Search report in DK patent application PA 2015 00141, 2 pages.

* cited by examiner

*Primary Examiner* — Timothy L Maust
(74) *Attorney, Agent, or Firm* — Ware, Fressola, Maguire & Barber LLP

(57) ABSTRACT

The invention relates to a centrifugal compressor or supercharger with an internal drive mechanism (30), which operates with great efficiency, higher speed and low noise. The compressor needs no lubrication and has a concentric input- and impeller shaft (13) for compactness. The compressor has two sets of belt drives (36) connected to a large sprocket (33).

10 Claims, 7 Drawing Sheets

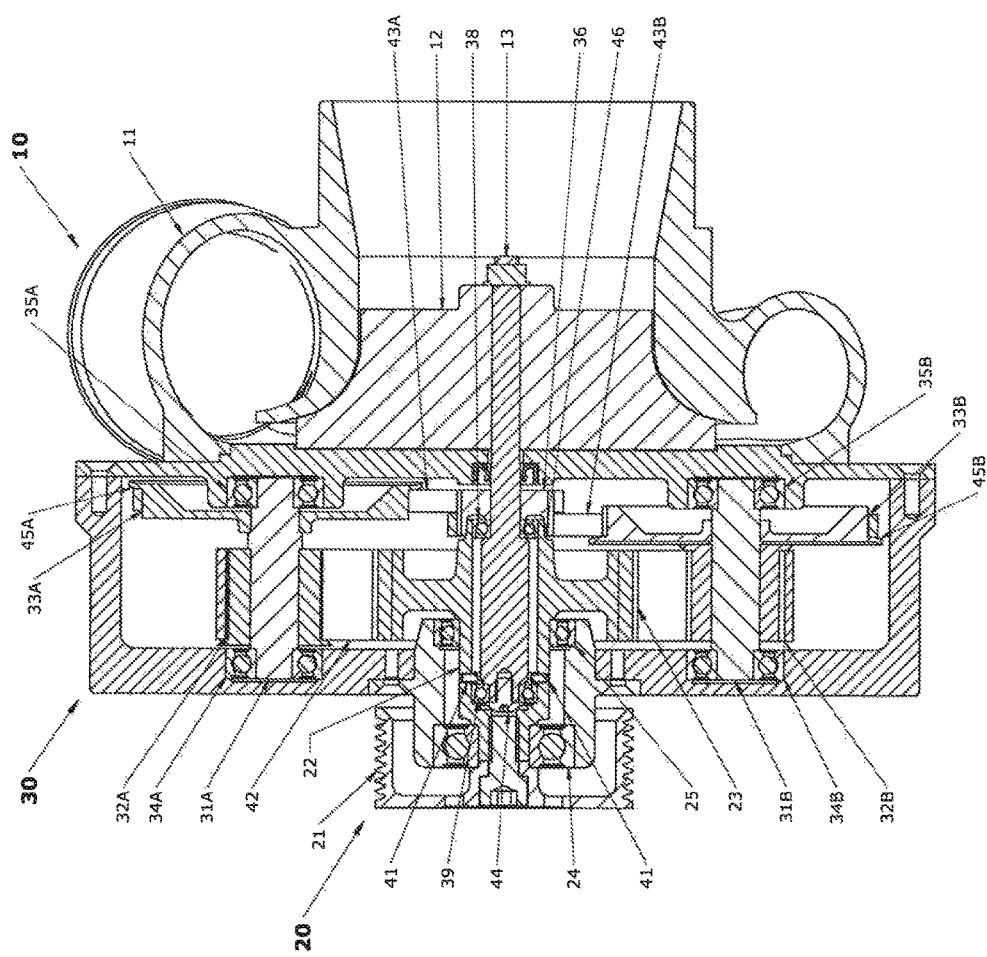

CENTRIFUGAL COMPRESSOR

BACKGROUND

The present invention relates to a centrifugal high-speed compressor, which drives lubrication free, comprising an internal drive mechanism of a compressor with an impeller on an impeller shaft and with an input shaft, which is driven by a motor or other means of power.

It is well known that a centrifugal compressor is able to compress air to a certain pressure ratio. It is also known that a centrifugal compressor is the most efficient air pump known. The most important part in the centrifugal compressor is the pump wheel or impeller. To work efficiently, however it needs very high rotational speed.

Therefore, a step-up ratio of minimum 6:1 from an input shaft to the impeller is generally. The internal drive mechanism of such a step-up gear typically consists of planetary gears or planetary gear drives. Because gears need lubrication, an oil supply is needed for the step-up transmission. To separate the compressed media from the oil a high-speed seal is needed between the media and the gear.

One way to avoid the oil system is to use a transmission that does not need lubrication. One such example is disclosed in U.S. Pat. No. 6,763,812 B2. However, this design limits the maximum ratio to below 4:1, which is not enough for smaller, efficient high-speed impellers.

The belt drive known from U.S. Pat. No. 6,763,812 B2 has only one cog belt and two sprockets. To cope with the high torque from the input shaft the belt has to be very wide to withstand the high tension in the belt cord. One of the issues in a single belt high-speed belt drive is to evacuate air trapped between the belt and the high-speed sprocket. The wider the belt for increased strength the more difficult is the evacuation of air. If the belt is made narrower and the air can escape to the sides, the belt will not withstand the tension.

SUMMARY OF THE INVENTION

The intension of the invention is to provide a compact compressor or supercharger with an internal drive mechanism, which, as compared to prior internal drive mechanisms, operates with greater efficiency, higher speed, and low noise compared to the compressing noise of the media. In addition, the invented drive needs no lubrication and has a concentric input- and impeller shaft for compactness.

A more specific object is to provide the drive with synchronous belts and pre-greased bearings. This makes the supercharger easy to install and maintenance free.

Another object is to provide an internal drive mechanism that incorporates stabilizing design features that reduce stress and tension to the belts.

The invention incorporates two sets of sprockets mounted on parallel shafts. Each shaft has a large and a small sprocket. The input shaft is connected to the first of the larger sprockets.

On that sprocket, an endless synchronous belt, preferable with carbon core for reduced elongation, lower weight and higher strength, transfers the torque to the first of the smaller sprockets being positioned on an idler shaft together with the second of the two larger sprockets in a rotatable combined locked manner. The other endless synchronous belt then transfers the torque from the second large sprocket on the idler shaft to the other small sprocket sitting on the impeller shaft concentric with the input shaft.

The ratio of this internal drive is the ratio of the two drives being multiplied. If as an example, the ratio each of the two drives is 3:1 the final ratio will be 9:1. Since the ratio 3:1 in each step is less than the ratio in U.S. Pat. No. 6,763,812B the belt on the small sprockets engage more teeth, due to the smaller diameter difference of the two sprockets, which reduces the stress in the belt because more teeth are sharing the load.

Due to the torque conversion of the first stage gear, a belt can be used in the second stage, which is approximately one third the width of the first stage belt width. A second stage belt with one third of the width of the first stage belt will allow the air caught between the belt and the sprocket to escape easily and the belt will only require the same tension as the wider input belt, because the torque is dramatically reduced.

Normally one of the sprockets in a pair has guiding plates on the sides, to keep the belt in place on the sprockets. When running two pairs of sprockets it is possible to avoid both side plates on the small high-speed sprocket and one of the guide plates on the larger high-speed sprocket. This because the two larger sprockets can be chamfered on the side pointing towards the opposite belt. This design secures the best possible way for the air to escape.

To further help the air escape during engagement between sprocket and belt a special design at the bottom of the teeth on the high-speed sprockets is used. This could typically be a 1 mm×1 mm axial channel, which is enough for the air that could find itself trapped under the belt, to escape at even very high belt speeds.

If the high-speed cog-belt has the longitudinal tensioning members made of carbon fibers, the strength is so high compared to conventional belts, that only a thin layer is needed. Since the bending forces on the belts are reduced with a minimized thickness, the heat developed in the belt also is reduced. This improves not only the operational life of the belt but also the efficiency.

When a normal endless cog belt is used, it is advisable to run idlers on both sides of the belt to prevent vibrations. The very high strength and longitudinal stiffness in the carbon fibers make these costly and complex idlers redundant.

A further advantage of the design is the possibility to use cheaper high-speed bearings on the output shaft. Since the output shaft is running in bearings situated inside the input shaft, the speed difference between the outer and inner races of the bearings is reduced because of the same rotational direction.

If the shape of the input shaft, keeping the outer high-speed bearings in place is conical, this will keep dirt away from the bearings due to the centrifugal forces transporting dirt to a larger diameter.

BRIEF DESCRIPTION OF THE DRAWINGS

Embodiments of the invention will in the following be described referring to the drawing, where

FIG. 7 is a cross-section taken along line VII-VII in FIG. 6.

DETAILED DESCRIPTION OF PREFERRED EMBODIMENTS

Figure 1:
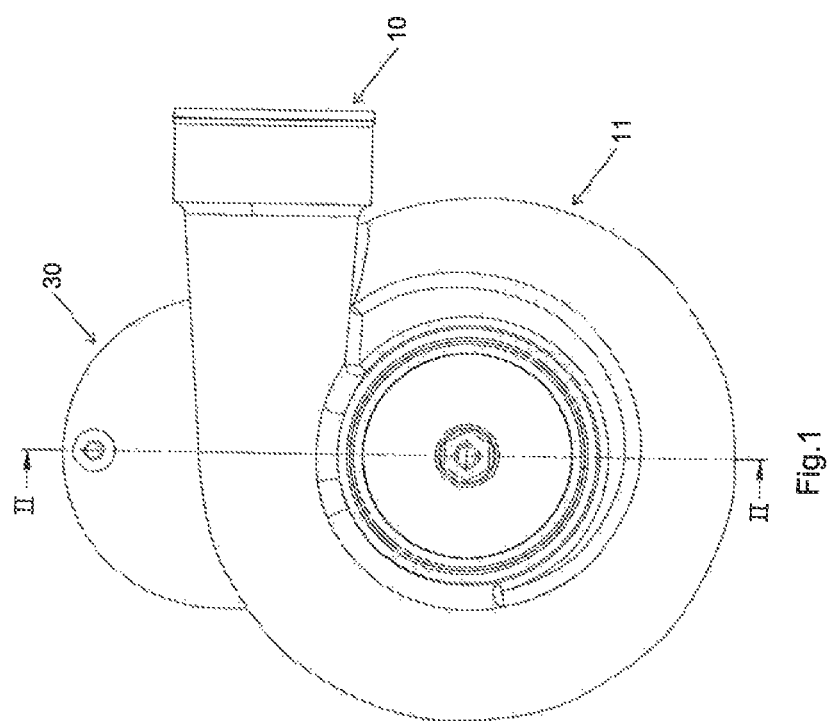
FIG. 1 is a full longitudinal view of a first embodiment of a compressor.
Figure 2:
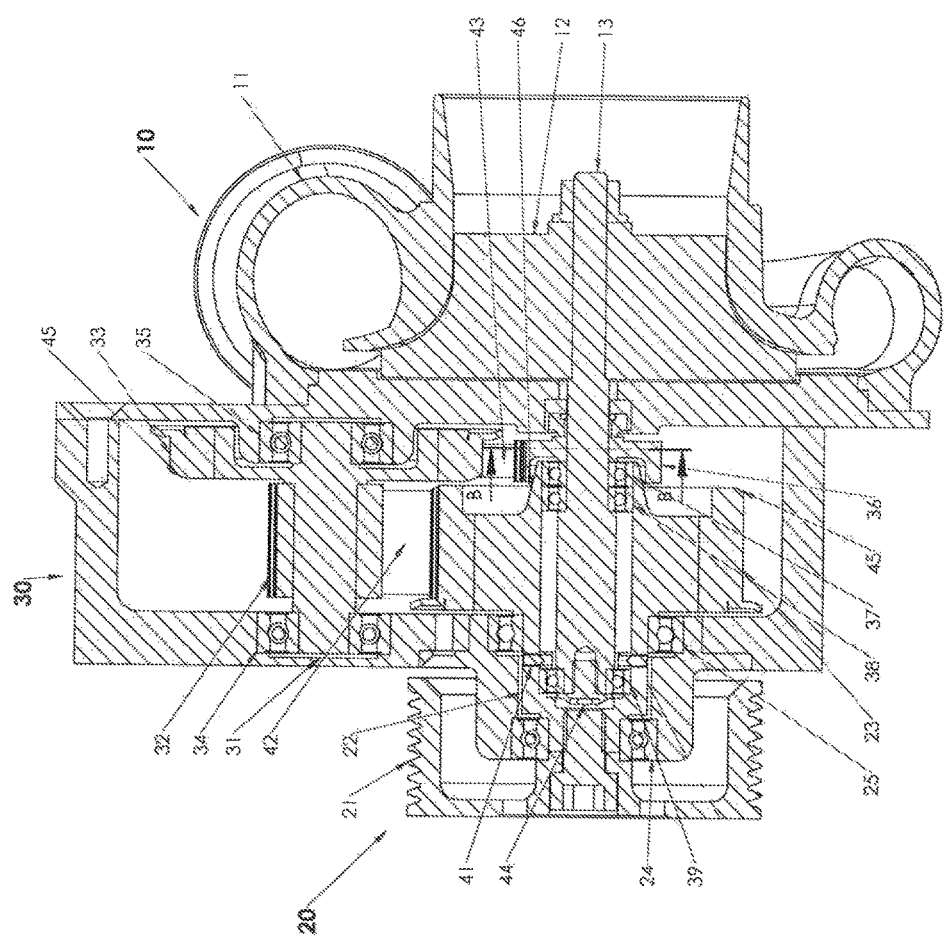
FIG. 2 is a cross-section taken along line II-II in FIG. 1.

Referring now to FIGS. 1 and 2, a first embodiment of a double carbon-belt drive compressor will be described.

The double carbon-belt drive unit includes a compressor 10 having a compressor housing 11 and impeller 12, an input drive 20 connected to the double carbon-belt drive 30.

The input drive 20 has a pulley, clutch or connective coupling 21 connected to the input shaft 22. The input sprocket 23 is locked to the input shaft 22. Bearings 24 and 25 are keeping the input shaft 22 rotatable in place.

The double carbon-belt drive 30 contains an idler shaft 31. On the idler shaft 31 is a wide sprocket 32, which has a smaller diameter and is wider in the axial direction than another sprocket 33, which are positioned in an internally locked rotatable position. The idler shaft 31 runs in bearings 34 and 35.

The second large narrow sprocket 33 drives a narrow small sprocket 36 that may for instance have a small diameter and be more or less comparable in width (in the axial direction) to the sprocket 33 but be narrower in width as compared to wide sprocket 32 as shown. The sprocket 36 is positioned on output shaft 13 running in high-speed bearings 37, 38 and 39. High-speed bearing 39 is axially locked to output shaft 13 by screw 44. High speed bearing 39 is then axially secured by screws 41.

Sprockets 33 and 23 have chamfer 45 on the side to guide the belts in axial position.

Input shaft 22 has a conical shape 46 to reduce dirt and particles reaching the high-speed bearings 37 and 38.

A wide tooth belt 42 transfers high torque from input sprocket 23 to wide sprocket 32.

A narrow tooth belt 43 transfers lower torque in the high-speed drive from sprocket 33 to sprocket 36.

Figure 3:
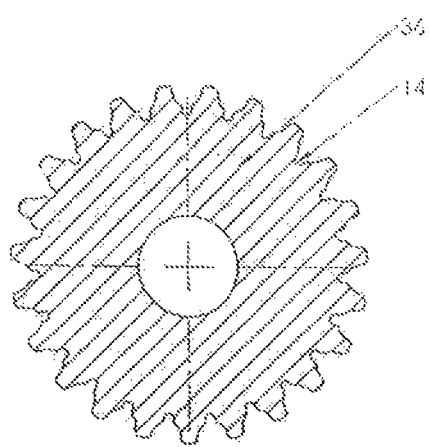
FIG. 3 is a cross section of the small high-speed sprocket illustrating the axial air channels.

FIG. 3 shows how air channels 14 are machined into the high-speed sprocket 36. When air is trapped between sprocket and belt in a normal high-speed application, the belt is lifted by the air cushion and will not have the ideal contact path to the sprocket. The channels 14 at the bottom of the grooves between the teeth help the trapped air to escape to the sides. If the sprocket with the highest speed has air channels and no flanges, the belt speed can be very high.

Figure 4:
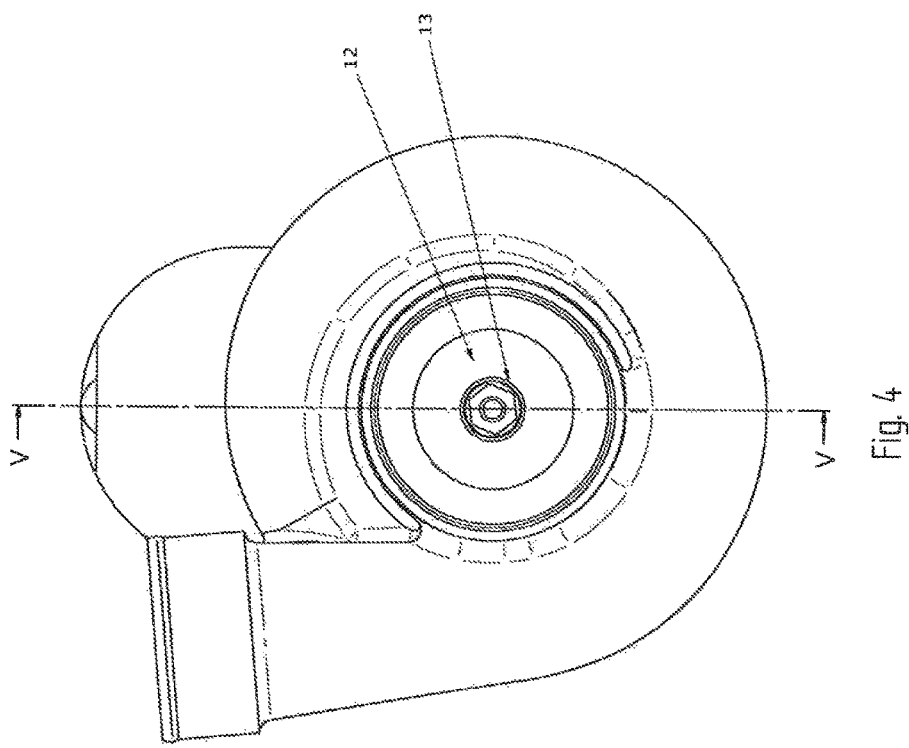
FIG. 4 is a full longitudinal view of a second embodiment of a two-stage direct drive centrifugal compressor.
Figure 5:
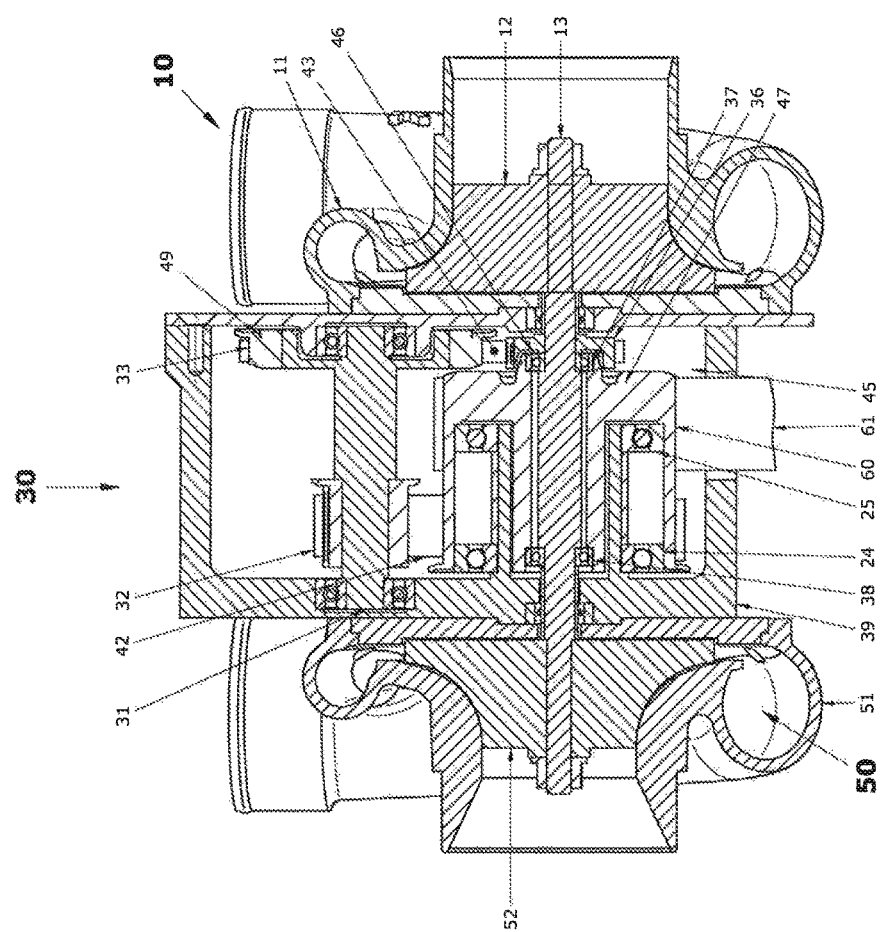
FIG. 5 is a cross-section taken along line V-V in FIG. 4.

A second embodiment shown on FIG. 4 and FIG. 5 will now be described.

If very high boost and flow is needed this embodiment is able to provide very high efficiency in an extremely lightweight and quiet solution that runs oil free. Production cost compared to other type of high-pressure compressors is very low.

In this embodiment, the unit has a second compressor 50.

The impeller shaft 13 is in this embodiment extended through the housing 39 and carries a second impeller 52 that runs in compressor housing 51.

The process media from compressor 10 is routed to the inlet of compressor 50 for further serial compression. Since the final pressure ratio is the pressure ratios from compressor 10 and compressor 50 multiplied, a total pressure ratio above 10:1 is possible.

An advantage of this design, since the two impellers compress the same amount of media, is that the axial shaft forces almost outbalance each other.

Power is supplied to the compressor via belt 61. Belt 61 drives the input sprocket 60. Input sprocket 60 then again drives the sprocket 32 on idler shaft 31 through belt 42. Sprocket 32 is connected to the narrow larger diameter sprocket 33 that again via belt 43 drives a smaller diameter narrow sprocket 46. Sprocket 46 is fitted to impeller shaft 13.

Impeller shaft 13 runs in high-speed bearings 37 and 38. Bearings 37 and 38 are mounted inside the input sprocket 60. Impeller shaft 13 and input sprocket 60 rotate in the same direction. Therefore, the demand to the high-speed bearings 37 and 38 can be reduced and cheaper bearings of standard quality can be used.

Input sprocket 60 runs in bearings 24 and 25, and has a groove 47 towards the small high-speed sprocket 36 where the air can escape.

To avoid axial belt guidance on the small high-speed sprocket 36, the input sprocket 60 has a chamfer 45 and the larger sprocket 33 has on the opposite side a flange 49.

Figure 6:
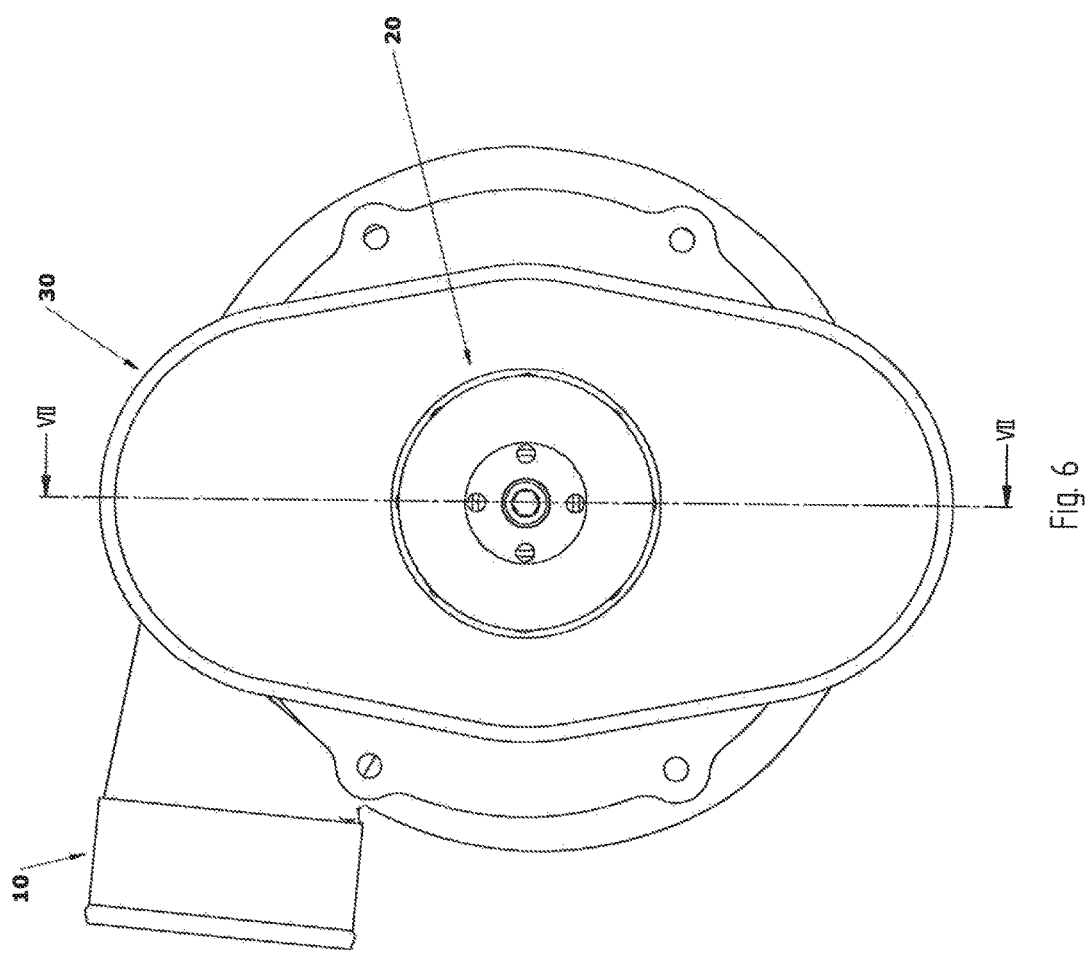
FIG. 6 is a third embodiment of a compressor.

FIGS. 6 and 7 show a third embodiment and will now be described.

If very high durability is needed the load on the high-speed bearings has to be reduced. One way of doing this is by fitting a second idler shaft in an opposite position to the other. Then the forces from the belt pull on the output sprocket can be almost eliminated.

Further, the load on the inner input-shaft bearing can be almost removed. Then a less space demanding bearing can be used.

This embodiment is able to provide very high durability in a lightweight and quiet solution that runs oil free. Production cost compared to other type of high-pressure compressors is very low.

The double carbon-belt drive unit 30 includes a compressor 10 having a compressor housing 11 and impeller 12, an input drive 20 connected to the double carbon-belt drive 30.

The input drive 20 has a pulley, clutch or connective coupling 21 connected to the input shaft 22. The input sprocket 23 is locked to the input shaft 22. Bearings 24 and 25 keep the input shaft 22 rotatable in place.

The double carbon-belt drive 30 contains two idler shafts 31A and 31B. The idler shaft 31A has an oppositely positioned idler shaft 31B. Sprockets 32A and 32B and the larger sprockets 33A and 33B are positioned in an internally locked rotatable position on the respective shafts. The idler shaft 31A runs in bearings 34A and 35A. The opposite positioned idler shaft 31B runs in bearings 34B and 35B. This helps to minimize the radial load on the bearings 38 and 39.

The two large narrow sprockets 33A and 33B drive the common small sprocket 36. The sprocket 36 is positioned on output shaft 13 running in high-speed bearings 38 and 39. High-speed bearing 39 is axially locked to output shaft 13 by screw 44. Screws 41 then axially secure high speed bearing 39.

Sprockets 33A and 33B have respective chamfers 45A and 45B on the sides to guide the belts 43A and 43B in axial position. Therefore, no side guides are needed on sprocket 36.

Input shaft 22 has a conical shape 46 to reduce dirt and particles reaching the high-speed bearings 39 and 38.

The wide tooth belt 42 transfers the high torque from input sprocket 23 to sprockets 32A and 32B.

The narrow tooth belts 43A and 43B transfer the lower torque in the high-speed drive from sprockets 33A and 33B to common small sprocket 36.

The invention claimed is:
1. A centrifugal high-speed compressor, comprising an internal drive mechanism with an impeller on an impeller shaft and with an input shaft, which is driven by a motive power source, wherein the input shaft is bedded concentrically with the impeller shaft, and the compressor contains two sets of gear drives and an idler shaft, upon which is mounted a first sprocket and a second sprocket, the first sprocket having a smaller diameter than the second sprocket that drives a sprocket locked to the impeller shaft in the internal drive mechanism, wherein the impeller shaft is bedded internally to the input shaft and rotates in a same direction.

2. The centrifugal high-speed compressor according to claim 1, wherein the compressor has a second idler shaft positioned opposite the idler shaft upon which is mounted the first sprocket and the second sprocket.

3. The centrifugal high-speed compressor according to claim 2, wherein the sprocket mounted on the impeller shaft has only one side guide.

4. The centrifugal high-speed compressor according to claim 1, wherein the input shaft has a conical shape where bearings are housed.

5. The centrifugal high-speed compressor according to claim 1, further comprising a second idler shaft positioned on another side of the input shaft opposite the idler shaft upon which is mounted the first sprocket and the second sprocket to minimize radial load on impeller shaft bearings in the internal drive mechanism.

6. A centrifugal high-speed compressor, comprising an impeller, an input shaft, and an internal drive mechanism locked to the input shaft for rotating the impeller by driving an output shaft locked to the impeller wherein the input shaft is driven with torque supplied by a motive power source, wherein the internal drive mechanism includes a first sprocket locked to the input shaft with the input shaft bedded concentrically with the output shaft, and the internal drive mechanism also includes an idler shaft, upon which is mounted a second sprocket, which has a smaller diameter than the first sprocket, wherein a first belt engages the first sprocket and the second sprocket to drive the idler shaft, and wherein a third sprocket is also mounted upon the idler shaft and has a diameter smaller than a fourth sprocket that is mounted on the output shaft, wherein a second belt engages the third sprocket and the fourth sprocket to drive the output shaft, and wherein the output shaft is bedded internally to the input shaft and rotates in a same direction.

7. The centrifugal high-speed compressor according to claim 6, wherein the compressor has a second idler shaft positioned opposite the idler shaft that the second sprocket and third sprocket are mounted on.

8. The centrifugal high-speed compressor according to claim 7, wherein the second sprocket has a singular side guide.

9. The centrifugal high-speed compressor according to claim 6, wherein the input shaft has a conical shape where bearings are housed.

10. A centrifugal high-speed compressor, comprising:
an impeller;
an output shaft connected to the impeller and kept rotatable in place by bearings;
an input drive including an input shaft kept rotatable in place by bearings, the input shaft bedded concentrically with the output shaft; and
a drive mechanism positioned between the input drive and the impeller, the drive mechanism comprising:
an input sprocket locked to the input shaft;
a first idler shaft positioned on one side of the input shaft and a second idler shaft positioned opposite to the first idler shaft on another side of the input shaft, each idler shaft journaled on bearings in a housing of the drive mechanism, each idler shaft having an input side sprocket and an output side sprocket locked thereto and driven by the input shaft; and
an output sprocket locked to the output shaft and driven in common by the output side sprockets on the respectrive idler shafts.

* * * * *